United States Patent [19]

Appenzeller et al.

[11] E Re. 29,251

[45] Reissued June 7, 1977

[54] MEANS FOR CONTINUOUS DYEING OF PILE WARP TEXTILES ESPECIALLY OF CARPETS

[75] Inventors: Valentin Appenzeller, Kempen, Johannes Kutz, Krefeld, both of Germany

[73] Assignee: Eduard Küesters Maschinenfabrik, Krefeld, Germany

[22] Filed: Dec. 18, 1974

[21] Appl. No.: 534,128

Related U.S. Patent Documents

Reissue of:

[64] Patent No.: 3,541,815
Issued: Nov. 24, 1970
Appl. No.: 650,450
Filed: June 30, 1967

U.S. Applications:

[63] Continuation of Ser. No. 308,710, Nov. 22, 1972, abandoned.

[52] U.S. Cl. ..... 68/22 R; 68/62; 68/99; 68/200

[51] Int. Cl.[2] ..... D06B 1/06

[58] Field of Search ..... 68/205 R, 200, 62, 9, 68/99, 22 R; 118/325, 407, 239; 26/2 R; 28/72 P, 74 P, 76 P

[56] References Cited

UNITED STATES PATENTS

| | | | |
|---|---|---|---|
| 596,905 | 1/1898 | McCoy | 118/325 X |
| 1,008,426 | 11/1911 | Milson | 68/22 R X |
| 1,882,439 | 10/1932 | Murphy | 68/205 R X |
| 1,932,727 | 10/1933 | Faulkner | 118/407 |
| 2,214,772 | 9/1940 | Muggleton | 118/239 X |
| 2,724,254 | 11/1955 | Zanger | 68/22 R X |
| 2,785,042 | 3/1957 | Grajeck et al. | 8/149.3 |
| 2,984,540 | 5/1961 | Tillett et al. | 8/152 |
| 3,271,102 | 9/1966 | Morgan | 68/205 R X |
| 3,454,970 | 7/1969 | Sutherland | 68/99 X |
| 3,606,772 | 9/1971 | Sando et al. | 68/9 |

FOREIGN PATENTS OR APPLICATIONS

| | | | |
|---|---|---|---|
| 763,471 | 12/1956 | United Kingdom | 68/202 |

*Primary Examiner*—Philip R. Coe
*Attorney, Agent, or Firm*—Kenyon & Kenyon Reilly Carr & Chapin

[57] ABSTRACT

Apparatus for dyeing a continuously moving textile web which comprises means to apply a wetting agent to said web, means to apply pressure to said web to improve the penetration of said wetting agent, at least one means to apply dye to said web, including a container to hold dye, a rotating roller positioned partially in said container and adapted to pick up dye on its surface, a scraper having one end adjacent said rotating roller and the other end adjacent and above said web, said scraper being positioned to remove dye from said rotating roller to cause dye to flow upon the web, and means, such as a pair of rollers, to apply pressure to said web to improve dye penetration.

20 Claims, 5 Drawing Figures

INVENTORS
VALENTIN APPENZELLER
JOHANNES KUTZ
BY Kenyon & Kenyon
ATTORNEYS

INVENTORS
VALENTIN APPENZELLER
JOHANNES KUTZ
BY
Kenyon & Kenyon
ATTORNEYS

MEANS FOR CONTINUOUS DYEING OF PILE WARP TEXTILES ESPECIALLY OF CARPETS

Matter enclosed in heavy brackets [ ] appears in the original patent but forms no part of this reissue specification; matter printed in italics indicates the additions made by reissue.

*This is a continuation of reissue application Ser. No. 308,710 filed Nov. 22, 1972, and now abandoned.*

The present invention relates to a means and method for continuous dyeing of pile warp textiles, especially of carpets in which, after impregnation with a wetting agent, the liquid dye is applied to the material.

Most recently carpets with synthetic fibers and a binding or backing are increasingly used as floor coverings.

At the outset of this development fibers which were dyed upon spinning were generally used for so-called tufting carpets, especially for needle pile carpets. From a great number of reasons such as storing and planning or process scheduling when tufting it has been tried to dye the ready carpets.

In this respect dyeing of carpets in winding vats has been used more and more in the last years. However, this way of dyeing is unsatisfying especially so because winding vat dyeing always includes discontinuous procedure and because some types of carpets such as those made of acryl fibers and those with open piles not being in the form of loops, cannot be dyed in the winding vat.

It has been attempted especially most recently to dye carpets of all types in a continuous process. The problem of dyeing cut pile textiles by such method is, however, far more serious than continuous dyeing of textiles of any kind. The problem results from various properties of the carpet type in question which will have to be observed when dyeing.

When dyeing carpets, for instance, the pile of the finished product is not permitted to be squeezed but must be open. Even the pile must be uniformly dyed down to the binding. With the dyeing methods which are known it is frequently likely to happen that the outer surface of the pile appears in the desired intensity of color or in the desired shade, while, however, there is no uniform dyeing of the pile down to the binding at the jute back the pile showing a lighter shade towards its root. And vice versa the pile tips may have a lighter color whereas the root has a deeper one. This is known as the frosting effect.

Several kinds of carpets and more particularly carpets manufactured from staple fibers are liable to carry an extremely high amount of loose threads, a fact which requires attention when dyeing. The thread ends get into the dye bath and will block pumps and feed pipes within no time at all. Sometimes thread ends will accumulate in the bath vat and stick to the carpet surface in various layers rendering the carpets useless since lighter spots of the carpet will turn out below such accumulated thread ends.

During dyeing extraction of the dyeing agents from the dye bath will have to be avoided. In case extraction of the dyeing agent occurs, for instance padding of the dye liquid onto the carpet within a foulard may result in the fact that the first applied color shade is darker than that at the end of the breadth, the reason being that on the way from soaking toward the roll nip excess dyeing fluid is returning which has already delivered part of its dye contents to the breadth, while the vat contents is experiencing a reduction in eye concentration.

The same applies to any dye on an alkali basis where there is the same danger that the alkali concentration will gradually be reduced.

The average weight of the most usual carpets is about 1000 g./m.$^2$.

Since, according to quality and desired pattern, for instance in difference dyeing, 100 to 300 and still more percent of dyeing fluid including corresponding chemical auxiliary agents must be applied, it will be necessary from reasons of economy to process by the aid of a minimum quantity of bath in any particular case. In this respect it is even desirable not to load the binding or the backing of the carpet unnecessarily with dyeing fluid because the binding portion may amount to 40 percent of the total weight of some carpet qualities.

Another requirement which is absolutely necessary for the dyeing of carpets, is uniform dyeing all over the entire breadth. This requirement can only be complied with under certain conditions.

Other difficulties arise from the manifold types of carpets which are by now on the market. The pile surface of some carpets has a pronounced pattern in the form of high and low pile. The variations in height within the individual pile areas may, for instance, range between 3 mm. and 15 mm. When such carpets are dyed, perfect dyeing all through the pile is extremely difficult to obtain. Another special problem in this connection is the removal of air included below the dye film.

At present different dye carpets are conquering an increasing market position. These carpets include various amounts of modified fibers which are tufted in a predetermined pattern. The fibers have been modified such that their dye acceptability differs very much. When these differently modified fibers are dyed, they will retain more or less dye the final result after dyeing being a carpet pile with a color pattern.

When these carpets are dyed, it will be necessary to attribute to the entire carpet surface a large excess of dye bath so that the fibers which have been modified as being particularly susceptible, are able to extract sufficient dye from their surroundings. Generally, this method is based on a bath quota of between 300 and 500 percent with respect to the original weight of the dry material. By special measures only a liquid load of this order may be balanced on the carpet. With this method obtaining of a uniform color throughout the breadth will be rather difficult.

A great number of tests, suggestions, and recommendations has been made to arrive at a solution in the total field of continuous dyeing of carpets which, on the one hand, does justice to carpet variations and which, on the other hand, defeats the problems outlined above.

The simplest method of continuous carpet dyeing is the padding of the dye liquid in the foulard. But this method will only be possible for some dyeings and for comparatively light carpets having a small amount of thread ends. Foulard dyeing involves the risk of the dyeing agent being extracted from the bath resulting in end non-uniformity of the dyed piece.

According to another suggestion carpet dyeing is to be effected such that first a wetting agent is sprayed on, excess wetting agent being removed by a batter, and subsequently dyeing agents are sprayed on their excess also being removed by vibration.

Apart from imperfect proportioning liable to occur with this method it will hardly be possible in practice to cover carpets of large widths such as 5 m. uniformly with sprayed dye.

Similar tests have already also been made with the so called pouring heads to which the dye bath is fed under pressure. Even in this case the risk that the bath is not uniformly penetrating down to the binding, i.e. dyeing all through the entire pile, involves considerable problems.

In order to guarantee a proportioned dye application the so called dye application rolls have been developed. Partly these rolls have been provided with a honeycomb rubber cover in which case a definite amount of dye fluid is fed to the honeycombs, or where the dye application roll is expected to apply the dye to the carpet pile in the presence of a controlled bath level. Naturally, with this method the dye can only be applied to the carpet pile from below. The carpet, therefore, is passing via an upper roll functioning as a press roll pressing the carpet against the lower proportioning or application roll.

In this case the most serious problem is exact proportioning. But the principal drawback is the necessity to apply the dye to the carpet from below. It will not be possible to apply any amount of dye to the carpet. The amount of dye which can be applied is merely so great that it corresponds to the saturation point of the pile fibers which are more or less close to each other. But in difference dyeing bath absorption of 300 to 500 percent of the dry weight of the material is required. A liquid load of this high order cannot be applied to the carpet from below since it exceeds by far the absorbing power of the carpet.

To avoid these drawbacks and to apply an as great dye excess as possible means have become known which do not employ mechanical distribution of the dye bath. The carpet is merely passed through a bath vat provided with a return roll and drawn off upwards to enter the damper. Part of the bath returns again down into the direction of the bath frame. The major part enters the damper together with the carpet.

This process allows for difference dyeings. It is however unfavorable in that due to the backflow of the bath non-uniformities of the color are easily liable to occur. In addition, extraction of the dyeing agents from the bath cannot be prevented so that either end non-uniformity will occur or long first ends must be run until the bath has reached equilibrium again. It is also unfavorable in that, due to the fact that proportioning will not be possible, frequently such an excess amount of dyeing agents will be present on the carpet that it cannot be at all taken up completely by the fibers. This results in comparatively high dyeing agent losses rendering the economical side of this method questionable.

The main object of the present invention is to provide a method and a means for the realisation of said method in which the problems outlined above will have been solved and the drawbacks experienced so far will have been eliminated, since dye absorption by the carpet will be limited, as far as possible, to the pile to be dyed and furthermore measures will be taken for uniform dyeing down to the bottom of the pile as well as to the entire length of the carpet without depending upon the absorbing power of the carpet. In addition bath application shall be effected corresponding to the dyeing method in question which application may be continuously controlled between a desired minimum and maximum.

With the method already mentioned this problem has been solved according to the present invention by passing the material or carpet following impregnation with the wetting agent through a squeezer, foulard, which is squeezing off and distributing the wetting agent. It is recommended to squeeze off the wetting agent as much as possible.

By squeezing off the wetting agent the same will be distributed uniformly on the material or carpet increasing the absorbing power of the carpet uniformly. At the same time the binding which from reasons of economy is to be dyed as little as possible, is already comparatively saturated with liquid before the dyeing fluid is applied.

Preferably a padding auxiliary agent is added to the wetting agent in the same proportional percentage as it will also be added to the actual dyeing fluid. In order to increase the viscosity a minor amount of thickening agents may also be added to the wetting fluid which thickeners approximately correspond to their composition to those later to be added to the dyeing fluid to be applied.

It may even be practical to add a minor amount of dyeing liquid to the wetting agent.

According to the present invention dye application following squeezing off may be effected such that the dye liquid is taken up by a roll immersing into a trough containing the dye liquid and rotating at a continuously controllable speed, stripped off by means of a rake or scraper from the roll before the roll enters again the trough, passed down via the scraper, and poured onto the pile face of the breadth passed below the scraper in the form of a uniform, continuous dye film the width of which will be controllable.

It is a special advantage in this respect that the liquid taken up by the roll immersing into the bath according to the predetermined roll speed is removed from the roll by the scraper and passed on to the surface of the breadth so that the nature and condition of the breadth does not have any influence on the quantity of the liquid applied. The quantity of the liquid removed from the roll will remain always the same because the liquid will have been stripped off from the roll before the roll will enter again the bath. It is furthermore favorable in that, according to the desired dyeing method, exact proportioning of dye application may be effected by correspondingly controlling the rotating speed of the roll.

The dyeing agent applied needs a certain time of contact according to the strength applied to enter into the surface of the carpet. However, sinking of the dyeing liquid will not suffice if the dyeing liquid is to penetrate the carpet down to the root of the fibers and fiber loops and to dye the same completely as well as uniformly. The present invention, therefore, provides for a mechanical step following dye application and effecting the dyeing liquid to penetrate and enter the root of the fibers or down to the carpet backing and comprising substantially a step of pressing in the dyeing liquid.

For this purpose the breadth may be passed with its pile face below a pressure means in the form of a rake or comb. The comb spaces the distances between which are preferably comparatively small, may have a depth exceeding the pile height.

In particular, penetration of the dyeing liquid into the pile may be effected such that following application of the dyeing liquid to the pile face of the breadth the same is passed between rolls, the roll acting upon the pile face being a grooved or comb roll.

It will even be possible to provide for a rake instead of the grooved roll, said rake having flow apertures for the dyeing liquid and softly pressing against the pile face, although a grooved roll will be preferred.

Due to the all around grooves it is guaranteed that the dye amount applied will not accumulate in front of the roll, but will pass the nip. Accumulation of dye in front of the roll must be avoided, for such accumulation and retaining of dyeing liquid would result in a steadily increasing dye bank as the breadth passes which bank would bring predetermined proportioning to nothing. In addition, accumulation would result in an extraction of dye particles and prevent reproduction of the design.

A means for the realisation of the method according to the present invention provides for a wetting unit, a pair of squeezing rolls following said unit, a subsequent dye applying unit to the pile face of the breadth in the form of a roll rotating and immersing into the dyeing liquid at the side of which that is falling upon rotation of the roll a scraper inclined towards the upper roll crown is contacting the total length of the roll or the width of the material breadth respectively, the breadth passing below said scraper on the scraper side not facing the breadth, and for a combing means pressing the dyeing liquid applied into the pile.

The wetting unit itself may consist of a basin or trough containing the wetting agent, the carpet being, for instance, passed via a return roll and at the same time being soaked with the liquid. Said soaking may suffice for carpets which permit processing comparatively free from loose threads.

However, with respect to carpets comprising a lot of loose threads, it is especially preferred to design the wetting means in the same way as the dye applying means.

The speed of rotation of the roll receiving the dyeing liquid is controllable, in particular continuously.

Preferably with a view to difference dyeings which require for large dye application and ask for dye liquids of comparatively low viscosity, it may be favorable to arrange several dye applying means in a sequence in order to be able, if necessary, to apply maximum quantities of dyeing liquid.

In order to provide for dye applications of different quantities, such as minor application in one color dyeing and maximum application in difference dyeing, it will be favorable to employ a majority of rolls having grooves of different sizes, of which one or the other may be used as required. When a major quantity of dye is applied, the roll having larger flow openings or grooves will be used; when a minor quantity of dye is applied, the roll having smaller flow openings or grooves will be used. The same applies if a scraper in the form of a comb will have been provided.

It is favorable to provide the grooved or comb roll as a roll having an elastic cover such as rubber. Even the scraper may be provided with a flexible cover.

Providing a floor covering such as a carpet with a pattern is very expensive. Measures must, therefore, be taken that in any case reproducible values are existing beforehand over the total width and length. According to the present invention such reproducible values are provided such that minor sections are pre-patterned by means of an equipment exactly corresponding to the dyeing equipment at a 1:1 scale, the only difference being that the width of said equipment has been reduced to about 50 cm.

The speeds of the dye application rolls must be exactly readable both with the pre-pattern equipment and with the actual dyeing equipment since this will be decisive for proportioning of the dyeing liquid and consequently for reproducibility. In the same manner the wetting values must be able to be reproduced exactly and this not only with respect to foulard pressure but also to roll hardness, roll diameter, and speed.

Following to the dyeing step the breadth is subject to a major time of steam fixing, it will then be washed and dried.

The drawing is a diagram of two embodiments of a means for the realisation of the method according to the present invention.

In either embodiment the carpet has been identified by 1. The carpet passes a wetting station A, a squeezing station B, one or several dye applying stations C as well as a dye penetrating station D, behind which the carpet loop is drawn off in the direction of the arrow E. The sag control of the loop has been defined as F.

Figure 1:
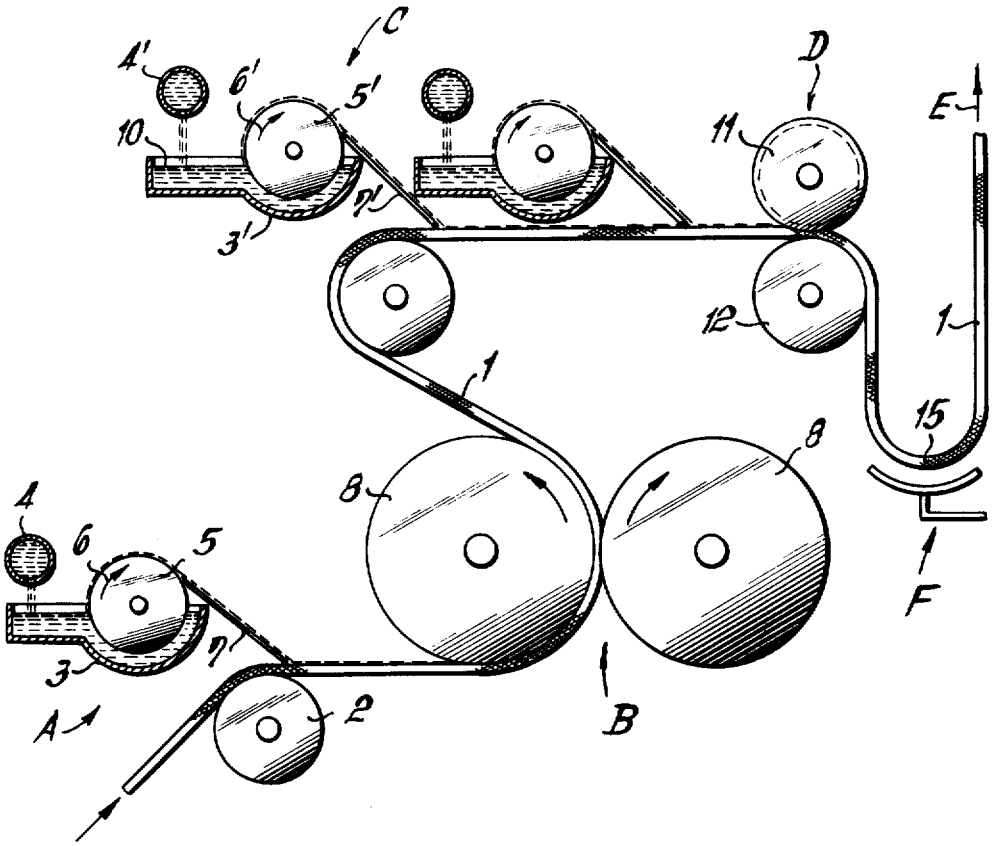
FIG. 1 is an elevational view of a first embodiment according to the present invention.

With the embodiment according to FIG. 1 the wetting station has been provided with a roll 2 via which the back of the carpet will be led. At the pile face there is a trough 3 containing the wetting fluid. Feeding of the wetting fluid is effected at 4. The roll 5 which is rotating and driven by an appropriate drive, is immersing into said trough or the liquid contained therein respectively. The speed of the roll is continuously controllable. If desired, the liquid level within the trough may be controllable too. The direction of rotation of the roll has been marked by the arrow 6. The scraper or rake 7 is contacting the roll throughout its length and the breadth throughout its width at the side of the roll which is falling upon rotation of the roll. The scraper is scraping off the liquid taken along by the roll out of the trough and passes it onto the pile face of the carpet.

The wetted breadth passes the squeezing rolls 8 of the squeezing station which are practically provided as non-deflective rolls and more particularly as [swimming rolls already known.] *Swimming Rolls of the type disclosed in U.S. Pat. No. 2,908,964 dated Oct. 20, 1959 and sold under trade name "Swimming Rolls" and the registered trademark "Küsters Swimming Rolls"*. The pressure of the squeezing roll may be controlled.

The breadth leaving the squeezing rolls or the squeezing station B passes the return roll and advances below the dye applying unit which, in FIG. 1, has been designed in the same manner both for the wetting equipment and said dye applying equipment, comprising a trough 3', a feeding 4', a roll 5' with its appropriate drive and the scraper 7', said roll immersing into a dye liquid 10 contained in the trough 3', and said scraper contacting the roll throughout its length and the breadth throughout its width, scraping off from the roll the dye liquid taken along from the roll out of the trough, and passing the dye liquid onto the pile face of the carpet. The direction of rotation of the roll has been marked by the arrow 6'. The rotating speed of the roll 5' may be continuously controlled. In the same manner the liquid level to be maintained in the trough may be controlled.

A majority of dye applying means may be arranged in a sequence. In FIG. 1 a second dye applying equipment has been indicated.

Figure 3:
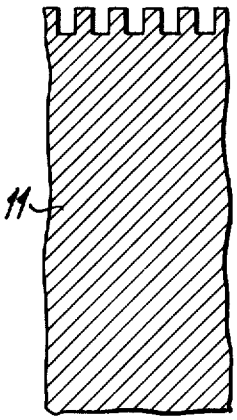
FIG. 3 is a sectional view of a grooved roll.

The breadth leaving the dye applicator passes between the rolls 11 and 12 of which roll 11 has been designed as a grooved roll. The grooves are comparatively close to each other. In the embodiment shown the width of the grooves is 1.5 mm. and the distance between the grooves is also 1.5 mm. The depth of the grooves is 3 mm. The grooved roll may be replaced by another grooved roll with another groove dimension to satisfy all requirements. FIG. 3 is a sectional view of a grooved roll.

Figure 4:
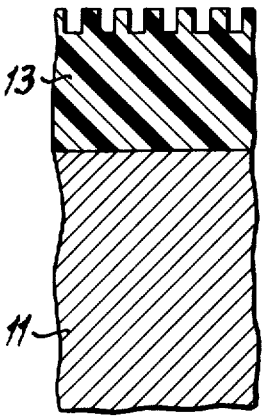
FIG. 4 is a sectional view of a grooved roll having a rubber cover.

The grooved roll may also be a roll having a rubber cover or a repulsive cover such as polytetrafluorethylene, as may be seen in FIG. 4. The flexible cover has been identified by 13.

Figure 5:
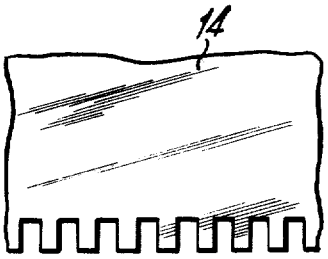
FIG. 5 is a sectional view of a scraper which may be used instead of a grooved roll.

Instead of a grooved or comb roll it may even be possible to provide a scraper 14 in the form of a comb a sectional view of which is shown in FIG. 5. Even the rake may be provided with a rubber cover or a similar one such as a polytetrafluorethylene cover. The rake must be inclined towards the direction of the running breadth in which case the end contacting the breadth is slightly bent off in the same direction.

The breadth leaving the pair of rolls 11 and 12 is sagging in the form of a loop 15 and is pulled off via a sag control from the same into the direction of the arrow E.

Figure 2:
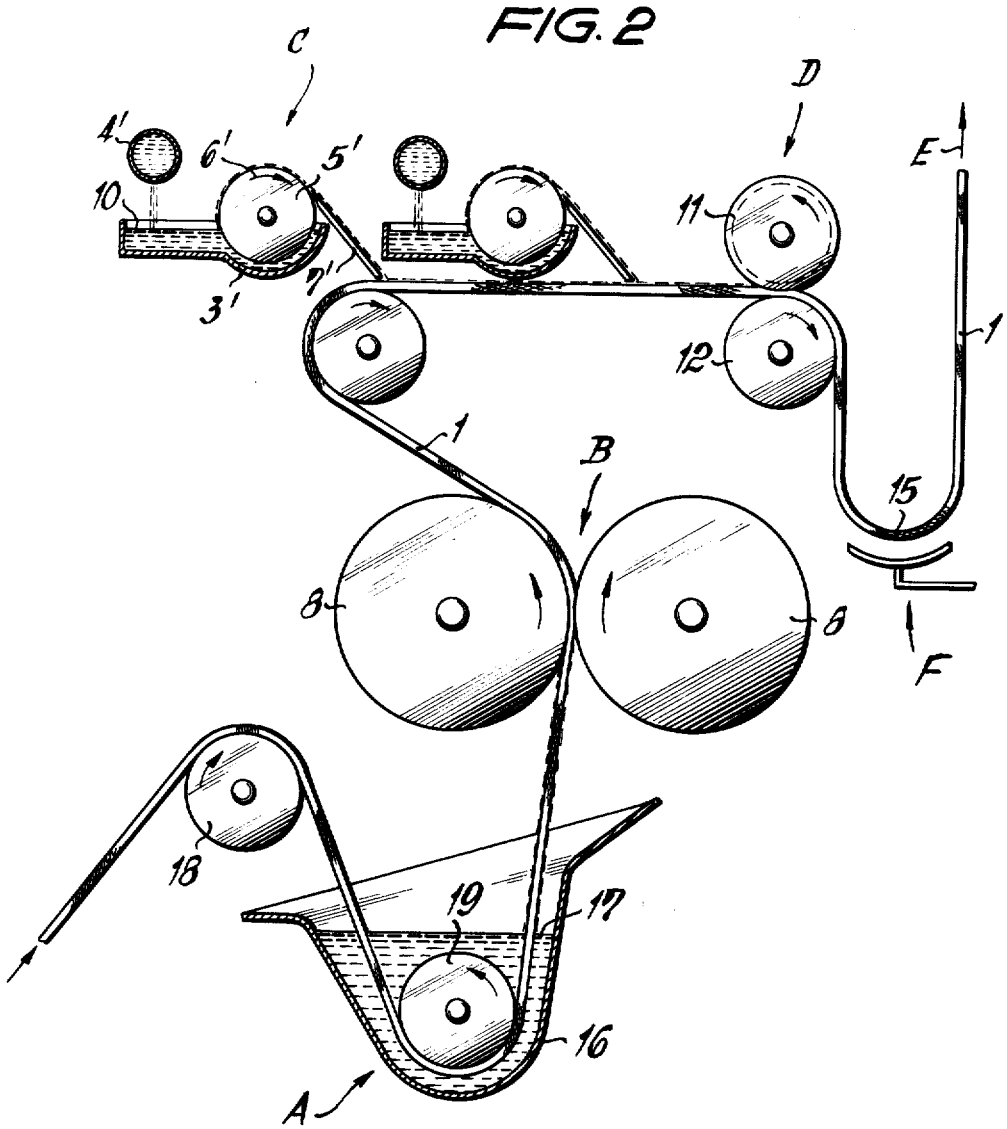
FIG. 2 is an elevational view of a second embodiment according to the present invention.

The difference between the embodiment according to FIG. 1 and that according to FIG. 2 is that, in FIG. 2, a trough 16 has been provided for wetting the breadth, said trough containing the wetting liquid 17. The carpet is passed through the wetting agent via the roll 18 and by means of the roll 19 located within the trough.

What we claim is:

1. Apparatus for dyeing a continuously moving *pile warp* textile web which comprises:

(A) means to apply a wetting agent to said web;

(B) means to apply *uniform* pressure to said web to improve the penetration of said wetting agent;

(C) at least one means to apply *a uniform continuous* dye *film* to *the pile warp of* said web, including a container to hold dye, a rotating roller adapted to carry dye on its surface as received from said container, a scraper having one end adjacent said rotating roller and the other end adjacent and above said web, and positioned to remove dye from said rotating roller to cause said dye to flow upon said *pile warp of said* web; and (D) means to apply pressure to said web to improve dye penetration, wherein each of said means is positioned in the sequence (A), (B), (C) and (D) along the direction of movement of said web.

2. The apparatus of claim 1 wherein said means (A) to apply a wetting agent includes a container to hold said wetting agent, a rotating roller adapted to carry said wetting agent on its surface as received from said container, a scraper having one end adjacent said rotating roller and the other end adjacent and above said web, and positioned to remove wetting agent from said rotating roller to cause said wetting agent to flow on said web.

3. The apparatus of claim 1 wherein said container to hold dye comprises a trough and said rotating roller is positioned above said trough with at least the lower portion of said rotating roller submerged in the dye in said trough.

4. The apparatus of claim 2 wherein said container to hold wetting agent includes a trough and said rotating roller adapted to carry wetting agent on its surface is positioned above said trough with at least its lower portion submerged in the wetting agent in said trough.

5. The apparatus of claim 1 wherein said means (B) to apply pressure to said web includes a pair of closely spaced *pressure controlled, non-deflective* rotating rollers [through] *between* which said web passes.

6. The apparatus of claim 1 wherein said means (D) to apply pressure to said web includes a pair of closely spaced rotating rollers through which said web passes.

7. The apparatus of claim 6 in which at least one of said rotating rollers of means (D) has a grooved surface.

8. The apparatus of claim 1 in which said means (D) to apply pressure to said web includes a member having a grooved edge in contact with said web.

*9. Apparatus for dyeing a continuously moving pile warp textile web which comprises:*

*(A) means to apply a wetting agent to said web;*

*(B) means to apply uniform pressure to said web to improve the penetration of said wetting agent; and*

*(C) at least one means to apply a uniform, continuous dye film to the pile warp of said web, wherein each of said means is positioned in the sequence (A), (B), and (C) along the direction of movement of said web.*

*10. The apparatus of claim 9, wherein said means (A) to apply a wetting agent includes a container to hold said wetting agent, a rotating roller adapted to carry said wetting agent on its surface as received from said container, a scraper having one end adjacent said rotating roller and the other end adjacent and above said web, and positioned to remove wetting agent from said rotating roller to cause said wetting agent to flow on said web.*

*11. The apparatus of claim 10, wherein said container to hold wetting agent includes a trough and said rotating roller adapted to carry wetting agent on its surface is positioned above said trough with at least its lower portion submerged in the wetting agent in said trough.*

*12. The apparatus of claim 9, wherein said means to apply dye to said web includes a container to hold dye, a rotating roller adapted to carry dye on its surface as received from said container, a scraper having one end adjacent said rotating roller and the other end adjacent and above said web, and positioned to remove dye from said rotating roller to cause said dye to flow upon said web.*

*13. The apparatus of claim 12, wherein said container to hold dye comprises a trough and said rotating roller is positioned above said trough with at least the lower portion of said rotating roller submerged in the dye in said trough.*

*14. The apparatus of claim 9, wherein said means (B) to apply pressure to said web includes a pair of closely spaced pressure controlled, non-deflective rotating rollers between which said web passes.*

*15. Apparatus for dyeing a continuously moving pile warp textile web which comprises:*

*(A) means to apply a uniform, continuous wetting agent film to said web;*

*(B) non-deflective roller means to apply uniform pressure to said web to uniformly distribute the wetting agent on the web and improve the penetration of said wetting agent; and*

*(C) at least one means to apply a uniform, continuous dye film to the pile warp of said web, wherein each of said means is positioned in the sequence (A), (B), and (C) along the direction of movement of said web.*

*16. The apparatus of claim 15, wherein said non-deflective roller means comprises a pair of closely spaced, pressure controlled, non-deflective rollers between which said web passes.*

*17. The apparatus of claim 15, wherein said means (A) to apply a wetting agent includes a container to hold said wetting agent, a rotating roller adapted to carry said wetting agent on its surface as received from said container, a scraper having one end adjacent said rotating roller and the other end adjacent and above said web, and positioned to remove wetting agent from said rotating roller to cause said wetting agent to flow on said web.*

*18. The apparatus of claim 17, wherein said container to hold wetting agent includes a trough and said rotating roller adapted to carry wetting agent on its surface is positioned above said trough with at least its lower portion submerged in the wetting agent in said trough.*

*19. The apparatus of claim 15, wherein said means to apply dye to said web includes a container to hold dye, a rotating roller adapted to carry dye on its surface as received from said container, a scraper having one end adjacent said rotating roller and the other end adjacent and above said web, and positioned to remove dye from said rotating roller to cause said dye to flow upon said pile warp of said web.*

*20. The apparatus of claim 15, wherein said container to hold dye comprises a trough and said rotating roller is positioned above said trough with at least the lower portion of said rotating roller submerged in the dye in said trough.*

* * * * *